(12) United States Patent
Asano

(10) Patent No.: US 12,095,375 B2
(45) Date of Patent: Sep. 17, 2024

(54) POWER SUPPLY APPARATUS AND IMAGE FORMING APPARATUS

(71) Applicant: CANON KABUSHIKI KAISHA, Tokyo (JP)

(72) Inventor: Hiroki Asano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 17/540,030

(22) Filed: Dec. 1, 2021

(65) Prior Publication Data

US 2022/0181976 A1    Jun. 9, 2022

(30) Foreign Application Priority Data

Dec. 7, 2020   (JP) ................................ 2020-202459

(51) Int. Cl.
*H02M 3/335*        (2006.01)

(52) U.S. Cl.
CPC .............................. *H02M 3/33561* (2013.01)

(58) Field of Classification Search
CPC .............................................. H02M 3/335–42
See application file for complete search history.

(56) References Cited

U.S. PATENT DOCUMENTS

| 5,530,636 | A | * | 6/1996 | Brown | ............... | H02M 3/33561 |
| | | | | | | 363/97 |
| 5,621,630 | A | * | 4/1997 | Suzuki | ............... | G03G 15/1675 |
| | | | | | | 399/88 |
| 2009/0051221 | A1 | | 2/2009 | Liu | | |
| 2015/0287580 | A1 | * | 10/2015 | Mizutani | ........... | H02M 3/33507 |
| | | | | | | 250/292 |

FOREIGN PATENT DOCUMENTS

| JP | S63061012 U | 4/1988 |
| JP | H10234178 A | 9/1998 |
| JP | H11262261 A | 9/1999 |
| JP | 2001037223 A | 2/2001 |
| JP | 2014165931 A | 9/2014 |
| JP | 2016154432 A | 8/2016 |
| JP | 2018196260 A | 12/2018 |

* cited by examiner

*Primary Examiner* — Peter M Novak
(74) *Attorney, Agent, or Firm* — Canon U.S.A., Inc. IP Division

(57) ABSTRACT

A power supply apparatus includes a transformer including a primary coil and a secondary coil, a switching element connected in series to the primary coil, a first generation unit configured to generate a first voltage to be output to a first load from a voltage generated in the primary coil by turning on and off the switching element, and a second generation unit configured to generate a second voltage to be output to a second load from a voltage generated in the secondary coil by turning on and off the switching element. The first voltage has an absolute value smaller than an absolute value of the second voltage. The first voltage has a polarity different from a polarity of the second voltage.

12 Claims, 5 Drawing Sheets

POWER SUPPLY APPARATUS AND IMAGE FORMING APPARATUS

BACKGROUND

Field

The present disclosure relates to a power supply apparatus and an image forming apparatus, for example, to a power supply using a transformer.

Description of the Related Art

There has been known a configuration of driving a primary side of one transformer to generate a plurality of power supply voltages on a secondary side of the transformer. For example, there exists a configuration of forming one coil on a secondary side of a transformer, connecting two pairs of a diode and a capacitor to both ends of the coil, and rectifying and smoothing voltages at respective ends, thereby generating two power supply voltages (Japanese Patent Application Laid-Open No. 2016-154432 filed on Dec. 28, 2015). Further, for example, there exists a configuration of forming two coils on a secondary side of a transformer, connecting a diode and a capacitor to both ends of each coil, and rectifying and smoothing voltages at respective ends, thereby generating two power supply voltages (Japanese Patent Application Laid-Open No. 2014-165931 filed on Feb. 21, 2013).

However, when two power supply voltages are generated that have significantly different voltages, a power supply apparatus can experience the following problems. In the case of the configuration in which one coil and two pairs of a diode and a capacitor are provided on the secondary side, in order to generate a low power supply voltage, it is required that the voltage that has been rectified and smoothed on one side be reduced. Thus, in such circumstances, power consumed at the time of the reduction in voltage is wasted. Further, when a low voltage is generated from a high voltage, a component that can withstand the high voltage is required. Further, in the case of the configuration in which two coils are provided on the secondary side, a coil frame for the transformer is restricted. Thus, in order to acquire a required inductance, it is required that a thin electric wire be used or a size of the transformer be increased. Accordingly, any of the above situations may cause an unnecessary increase in component cost or an unnecessary increase in circuit area.

SUMMARY

Various embodiments of the present disclosure provide techniques and mechanisms for generating a plurality of voltages having a large electric potential difference while suppressing a rise in cost or an increase in the area of a circuit board.

According to one embodiment of the present disclosure, there is provided a power supply apparatus, including: a transformer including a primary coil and a secondary coil; a switching element connected in series to the primary coil; a first generation unit configured to generate a first voltage to be output to a first load from a voltage generated in the primary coil by turning on and off the switching element; and a second generation unit configured to generate a second voltage to be output to a second load from a voltage generated in the secondary coil by turning on and off the switching element, wherein the first voltage has an absolute value smaller than an absolute value of the second voltage, and the first voltage has a polarity different from a polarity of the second voltage.

According to one embodiment of the present disclosure, there is provided an image forming apparatus, including: an image forming unit configured to form an image on a recording material; a transformer including a primary coil and a secondary coil; a switching element connected in series to the primary coil; a first generation unit configured to generate a first voltage to be output to a first load from a voltage generated in the primary coil by turning on and off the switching element; and a second generation unit configured to generate a second voltage to be output to a second load from a voltage generated in the secondary coil by turning on and off the switching element, wherein the first voltage has an absolute value smaller than an absolute value of the second voltage, and the first voltage has a polarity different from a polarity of the second voltage.

Further features of embodiments of the present disclosure will become apparent from the following description of example embodiments with reference to the attached drawings.

DESCRIPTION OF THE EMBODIMENTS

Example embodiments of the present disclosure will be described in detail next with reference to the accompanying drawings.

First Embodiment

Figure 1:
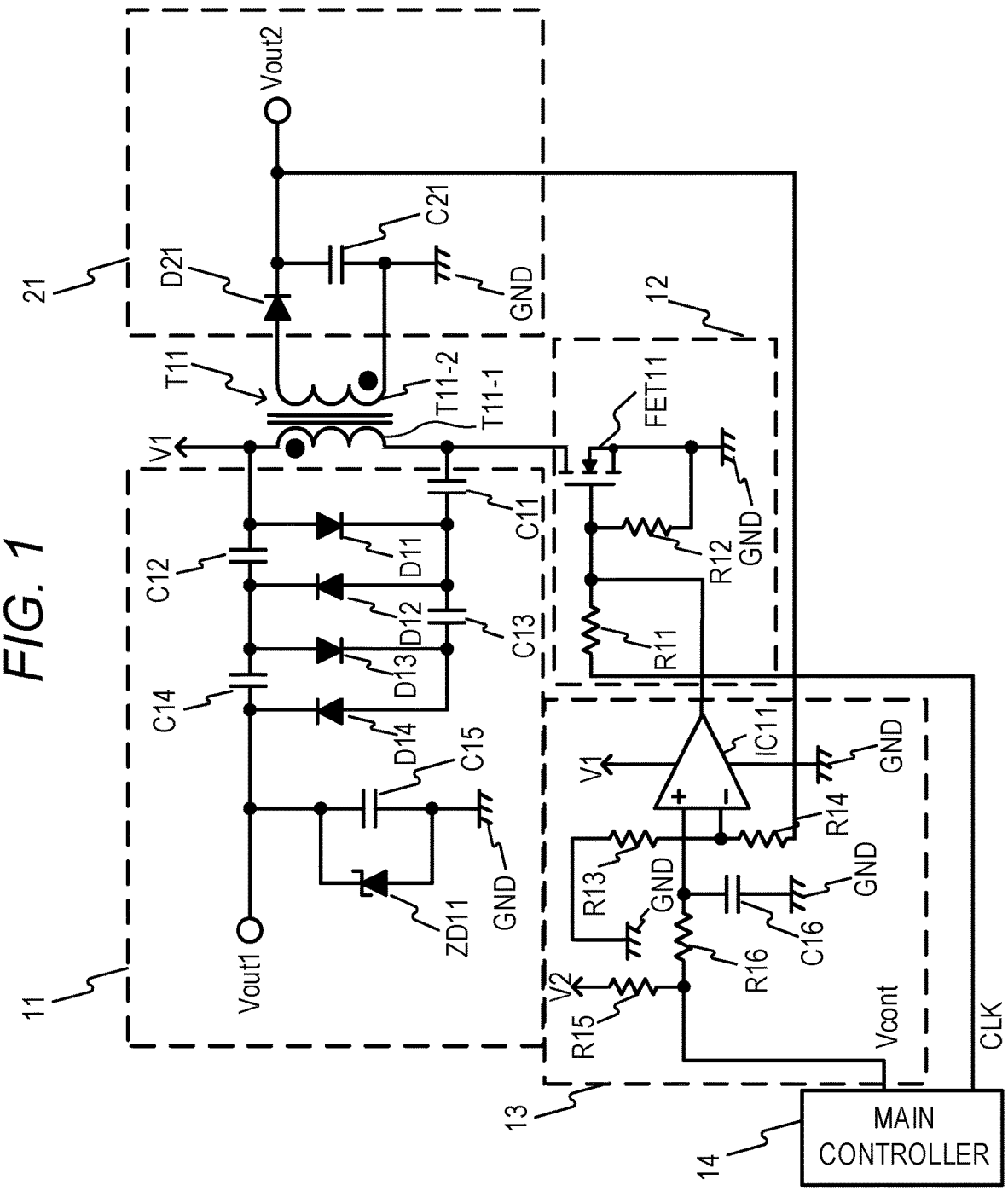
FIG. 1 is a circuit diagram of a power supply apparatus according to a first embodiment.

A first embodiment is described with reference to FIG. 1, which shows a power circuit. The power circuit described in the first embodiment is to be used as, for example, a power circuit configured to output a high voltage in electrophotography of an image forming apparatus. First, an overall configuration of the power circuit is described.

[Power Circuit]

A transformer T11 is formed of a primary coil T11-1 and a secondary coil T11-2. A power supply voltage V1 is connected to one terminal (hereinafter also referred to as "one end") of the primary coil T11-1. A drive circuit unit 12 is connected to another terminal (hereinafter also referred to as "another end") of the primary coil T11-1. Further, a primary power generator 11 being a first generation unit is connected between the terminals of the primary coil T11-1. Meanwhile, a secondary power generator 21 being a second generation unit is connected between terminals of the secondary coil T11-2. The power supply voltage V1 in the first embodiment is, for example, 24 V. Next, each block is described in detail.

(Drive Circuit Unit 12)

First, the drive circuit unit 12 is described. The drive circuit unit 12 includes a field-effect transistor (hereinafter referred to as "FET11") being a switching element, a gate resistor R11, and a gate-source resistor R12. Here, the FET11 has a drain terminal connected to the another end of the primary coil T11-1 of the transformer T11, and has a source terminal connected to a ground (hereinafter referred to as "GND"). The gate resistor R11 has one end connected to a gate terminal of the FET11, and has another end connected to a CLK terminal of a main controller 14 configured to manage operation of the power supply.

When a signal at a high level is output from the CLK terminal of the main controller 14, the FET11 is turned on, and a drain voltage of the FET11 is lowered to a level that is substantially equal to that of the GND. Accordingly, a voltage is applied to the both ends of the primary coil T11-1 of the transformer T11 so that an exciting current flows. In this state, when the voltage output from the CLK terminal changes to a low level, the FET11 is turned off, and a flyback voltage is generated at the both ends of the primary coil T11-1. In actuality, the voltage output from the CLK terminal has a rectangular wave in which a high level and a low level alternately occur. In the first embodiment, for example, a fixed rectangular wave having a frequency of 50 kHz and a duty cycle (hereinafter referred to as "Duty") of 10% is output. It is required that the frequency and the Duty of the rectangular wave be designed with values optimum for each circuit, and the values given in the first embodiment are examples. Further, it is not always required that the values be fixed values, and the values may be variable depending on a voltage or a load of a control target.

(Primary Power Generator 11)

Next, the primary power generator 11 is described. The primary power generator 11 includes a multi-stage booster circuit, a capacitor C15, and a Zener diode ZD11. The multi-stage booster circuit is formed with use of capacitors C11, C12, C13, and C14 and diodes D11, D12, D13, and D14. In the multi-stage booster circuit, a circuit in which the diode D11 and the capacitor C11 are connected to each other in series is connected to the primary coil T11-1 in parallel. In this case, an anode of the diode D11 is connected to the power supply voltage V1 (one end of the primary coil T11-1). Further, a circuit in which the diode D12 and the capacitor C12 are connected to each other in series is connected to the diode D11 in parallel. In this case, an anode of the diode D12 is connected to a cathode of the diode D11.

Similarly, a circuit in which the diode D13 and the capacitor C13 are connected to each other in series is connected to the diode D12 in parallel. In this case, an anode of the diode D13 is connected to a cathode of the diode D12. Further, a circuit in which the diode D14 and the capacitor C14 are connected to each other in series is connected to the diode D13 in parallel. In this case, an anode of the diode D14 is connected to a cathode of the diode D13. Further, a cathode of the diode D14 is connected to a primary-side power supply voltage Vout1 being a first voltage. One end of the capacitor C15 and a cathode of the Zener diode ZD11 are connected to the primary-side power supply voltage Vout1, and another end of the capacitor C15 and an anode of the Zener diode ZD11 are connected to the GND. As described above, the primary power generator 11 includes a multi-stage rectifying/smoothing circuit in which a plurality of rectifiers each including at least a diode and a capacitor are connected, and the multi-stage rectifying/smoothing circuit is connected to the both ends of the primary coil T11-1.

When the FET11 is turned on, a current flows from the power supply voltage V1 to the GND via the diode D11, the capacitor C11, and the FET11 so that the capacitor C11 is charged. The voltage charged into the capacitor C11 is substantially equal to the power supply voltage V1. When the FET11 is turned off in this state, the flyback voltage generated in the primary coil T11-1 causes a current to flow through the capacitor C11, the diode D12, and the capacitor C12 in the stated route so that the capacitor C12 is charged. The voltage charged into the capacitor C12 corresponds to a value obtained by subtracting the power supply voltage V1 from a sum of the flyback voltage and the charging voltage of the capacitor C11, that is, the flyback voltage.

After that, when the FET11 is turned on again, a current flows from the power supply voltage V1 through the capacitor C12, the diode D13, the capacitor C13, the capacitor C11, and the FET11 in the stated path so that the capacitor C13 is charged. The voltage charged into the capacitor C13 corresponds to a voltage obtained by subtracting the voltage charged into the capacitor C11 from a sum of the power supply voltage V1 and the voltage charged into the capacitor C12, that is, the flyback voltage. Next, when the FET11 is turned off again, the flyback voltage generated in the primary coil T11-1 causes a current to flow through the capacitor C11, the capacitor C13, the diode D14, the capacitor C14, and the capacitor C12 in the stated route so that the capacitor C14 is charged. The voltage charged into the capacitor C14 corresponds to a value obtained by subtracting the voltage charged into the capacitor C12 and the power supply voltage V1 from a sum of the flyback voltage, the charging voltage of the capacitor C11, and the charging voltage of the capacitor C13, that is, the flyback voltage. In summary, as the voltages charged into the capacitors, the power supply voltage V1 is charged into the capacitor C11, and the flyback voltage is charged into the capacitors C12, C13, and C14.

The voltage boosted by the multi-stage booster circuit in such a manner is smoothed at the capacitor C15. The smoothed voltage has a value of "power supply voltage V1+flyback voltage×2", which corresponds to a sum of the power supply voltage V1 and the voltages charged into the capacitors C12 and C14. The Zener diode ZD11 is connected for the purpose of clamping so as to prevent the primary-side power supply voltage Vout1 from becoming higher than required due to variation in the flyback voltage.

Here, the flyback voltage is determined mainly based on an inductance of the transformer T11. However, in actuality, the flyback voltage may vary also depending on, for example, a leakage inductance of the transformer T11, a switching speed of the FET11, and a current that flows through the FET11 when the FET11 is in the off state, and significantly varies. The flyback voltage in the first embodiment is approximately 80 V. Thus, the primary-side power supply voltage Vout1 obtained by a multi-stage booster circuit having four stages is approximately 180 V. Further, in the first embodiment, the multi-stage booster circuit is formed of four capacitors and four diodes. However, the number of stages is not limited to four, and is required to be optimized in accordance with specifications of the primary-side power supply voltage Vout1. Further, a value of the clamp voltage of the Zener diode ZD11 is required to be determined in accordance with the voltage accuracy of the primary-side power supply voltage Vout1 and specifications of the ripples, and may be omitted under certain circumstances. In the first embodiment, the voltage required as the primary-side power supply voltage Vout1 is 120 V, and a minimum value of the voltage generated in the primary-side power supply voltage Vout1 is 130 V. Accordingly, the clamp voltage of the Zener diode ZD11 is set to 120 V. For example, in an image forming apparatus, the primary-side power supply voltage Vout1 is used as a developing positive voltage in a developing step.

(Secondary Power Generator 21)

Next, the secondary power generator 21 is described. The secondary power generator 21 includes a diode D21 and a capacitor C21. An anode of the diode D21 is connected to one end of the secondary coil T11-2 of the transformer T11. A cathode of the diode D21 is connected to one end of the capacitor C21. Another end of the capacitor C21 is connected to the GND. As described above, the secondary power generator 21 includes a rectifying/smoothing circuit including at least a diode and a capacitor, and the rectifying/smoothing circuit is connected to both ends of the secondary coil T11-2.

By the operation of turning the FET11 on and off, the flyback voltage generated in the secondary coil T11-2 is rectified and smoothed at the diode D21 and the capacitor C21 so that a secondary-side power supply voltage Vout2 being a second voltage is generated. The secondary-side power supply voltage Vout2 in the first embodiment is, for example, 1,500 V. As described above, the primary-side power supply voltage Vout1 is, for example, 120 V, and the secondary-side power supply voltage Vout2 is, for example, 1,500 V. The primary-side power supply voltage Vout1 has an absolute value smaller than that of the secondary-side power supply voltage Vout2 (|Vout1|<|Vout2|). For example, in an image forming apparatus, the secondary-side power supply voltage Vout2 is used as a charging voltage in a charging step.

(Voltage Controller 13)

Finally, a voltage controller 13 is described. The voltage controller 13 is formed of a comparator IC11 and peripheral circuits thereof. The comparator IC11 is driven by the power supply voltage V1. A negative input terminal (negative terminal) of the comparator IC11 is connected to the GND via a resistor R13, and is connected to the secondary-side power supply voltage Vout2 via a resistor R14. That is, a value obtained by dividing the secondary-side power supply voltage Vout2 by the resistor R14 and the resistor R13 is input to the negative input terminal of the comparator IC11.

A positive input terminal (positive terminal) of the comparator IC11 is connected to a power supply voltage V2 via a resistor R16 and a resistor R15, and is further connected to the GND via a capacitor C16. A connection point between the resistor R15 and the resistor R16 is connected to a Vcont terminal of the main controller 14. Further, an output terminal of the comparator IC11 is connected to the gate of the FET11.

From the Vcont terminal of the main controller 14, a pulse signal in which a high-impedance (hereinafter referred to as "Hi-Z") state and a low (hereinafter referred to as "Lo") state are alternately repeated is output. When the Vcont terminal is in the Hi-Z state, a current for charging the capacitor C16 flows from the power supply voltage V2 via the resistor R15 and the resistor R16. Meanwhile, when the Vcont terminal is in the Lo state, a current for allowing the capacitor C16 to discharge flows to the Vcont terminal via the resistor R16. When the Vcont terminal repeats the Hi-Z state and the Lo state, the balance of charging and discharging of the capacitor C16 is stabilized at a predetermined voltage. Thus, in accordance with a Duty of the pulse signal output from the Vcont terminal, a voltage of the positive input terminal of the comparator IC11 is determined.

When the voltage of the negative input terminal of the comparator IC11 is lower than that of the positive input terminal, the output terminal of the comparator IC11 is brought into the Hi-Z state. In this case, a signal output from the CLK terminal of the main controller 14 directly drives the FET11 to turn on and off. Meanwhile, when the voltage of the negative input terminal of the comparator IC11 is higher than that of the positive input terminal, the output terminal of the comparator IC11 is brought into the Lo state. In this case, the current output from the CLK terminal of the main controller 14 is drawn by the output terminal of the comparator IC11, and the gate voltage of the FET11 is forcibly brought into the low level. That is, the FET11 cannot be turned on at the timing at which the FET11 is required to be turned on, and hence lowering of the secondary-side power supply voltage Vout2 is accelerated. With this operation, the secondary-side power supply voltage Vout2 can be controlled to a predetermined voltage. Here, the power supply voltage V2 in the first embodiment is, for example, 5 V. As described above, the power supply voltage V2 affects the voltage of the positive input terminal of the comparator IC11. Thus, it is required to keep in mind that a power supply having a relatively high voltage accuracy is required to be used as the power supply voltage V2.

As described above, when one power supply voltage is generated by boosting the primary coil of the transformer in multiple stages, two power supply voltages having a large difference in voltage can be achieved with a small circuit area and at low cost. Consequently, according to the first embodiment, while suppressing the rise in cost and the increase in area of the board, a plurality of voltages having a large electric potential difference can be generated.

Second Embodiment

Figure 2:
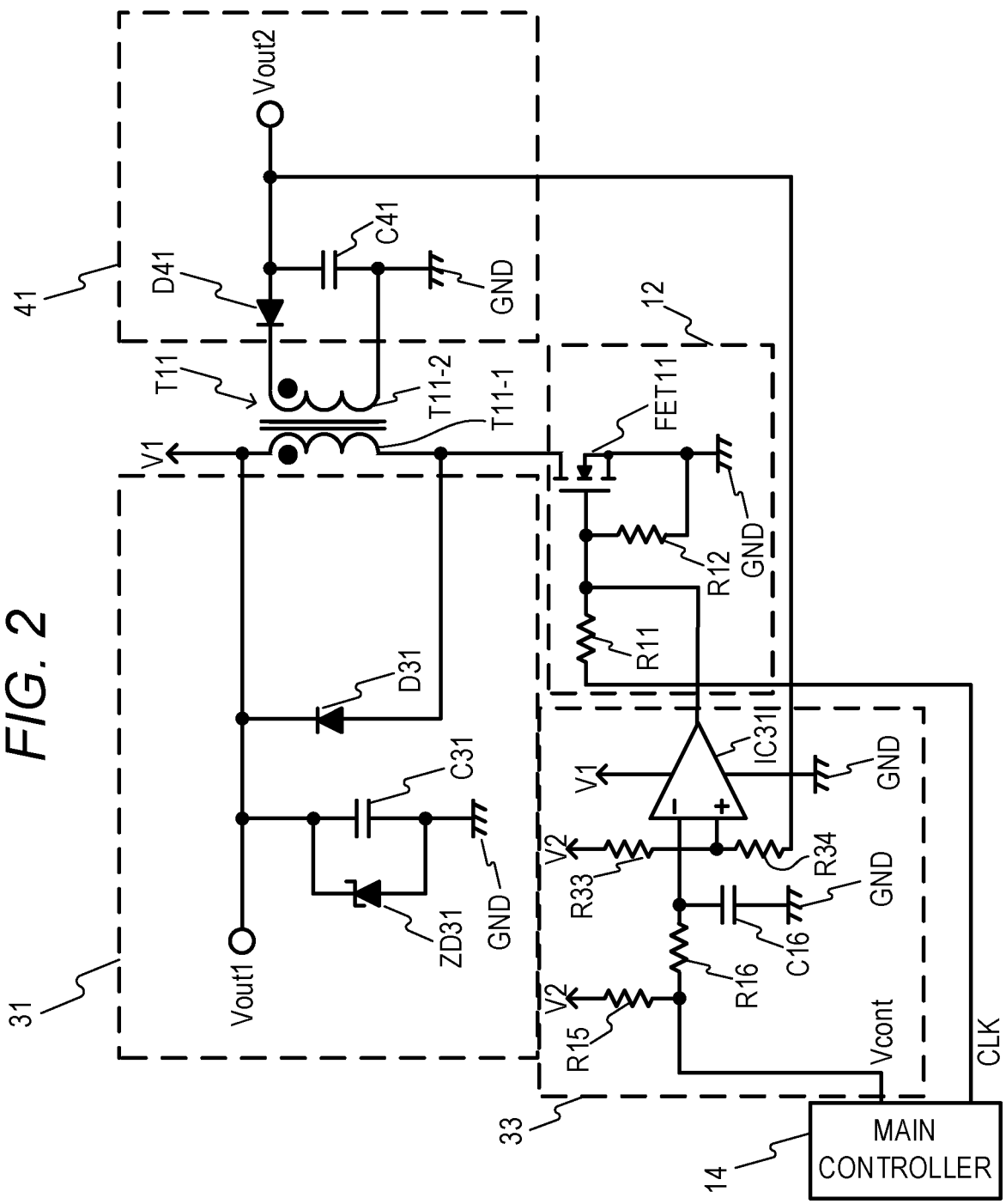
FIG. 2 is a circuit diagram of a power supply apparatus according to a second embodiment.

A second embodiment is described. The second embodiment is different from the first embodiment only in the primary power generator, the secondary power generator, and the voltage controller. In the second embodiment, only parts different from those of the first embodiment are described. Parts which are equivalent to those of the first embodiment are denoted by the same reference symbols, and description thereof is omitted. For description, FIG. 2 showing a power circuit is used.

(Primary Power Generator 31)

First, a primary power generator 31 is described. The primary power generator 31 includes a diode D31, a capacitor C31, and a Zener diode ZD31. That is, the primary power generator 31 includes one rectifier connected to the primary coil. An anode of the diode D31 is connected to the drain of the FET11. A cathode of the diode D31 is connected to one end of the capacitor C31 and a cathode of the Zener diode ZD31. Another end of the capacitor C31 and the anode of the Zener diode ZD31 are connected to the GND.

The flyback voltage generated by turning on and off the FET11 is rectified and smoothed by the diode D31 and the capacitor C31 so that the primary-side power supply voltage Vout1 is generated. A sum of the flyback voltage and the power supply voltage V1 is output as the primary-side power supply voltage Vout1. The Zener diode ZD31 is connected for the purpose of clamping so as to prevent the primary-side power supply voltage Vout1 from becoming higher than required. In the second embodiment, the voltage required as the primary-side power supply voltage Vout1 is 75 V, and a minimum value of the voltage generated in the primary-side power supply voltage Vout1 is 100 V. Thus, the clamp voltage of the Zener diode ZD31 is set to 75 V.

(Secondary Power Generator 41)

Next, a secondary power generator 41 is described. The secondary power generator 41 includes a diode D41 and a capacitor C41. A cathode of the diode D41 is connected to one end of the secondary coil T11-2 of the transformer T11. An anode of the diode D41 is connected to one end of the capacitor C41. Another end of the capacitor C41 is connected to the GND. By the operation of turning the FET11 on and off, the flyback voltage generated in the secondary coil T11-2 is rectified and smoothed at the diode D41 and the capacitor C41 so that the secondary-side power supply voltage Vout2 is generated. The secondary-side power supply voltage Vout2 in the second embodiment is, for example, −1,500 V. As described above, the primary-side power supply voltage Vout1 is, for example, 75 V, and the secondary-side power supply voltage Vout2 is, for example, −1,500 V. Also in the second embodiment, the primary-side power supply voltage Vout1 has an absolute value smaller than that of the secondary-side power supply voltage Vout2 (|Vout1|<|Vout2|). The second embodiment is characterized in that the secondary-side power supply voltage Vout2 has a polarity (negative polarity) opposite to a polarity (positive polarity) of the primary-side power supply voltage Vout1, that is, the secondary-side power supply voltage Vout2 has a polarity different from that of the primary-side power supply voltage Vout1.

(Voltage Controller 33)

Finally, a voltage controller 33 is described. The voltage controller 33 is formed of a comparator IC31 and peripheral circuits thereof. A positive input terminal of the comparator IC31 is connected to the power supply voltage V2 via a resistor R33, and is connected to the secondary-side power supply voltage Vout2 via a resistor R34. That is, a value obtained by dividing a voltage range between the secondary-side power supply voltage Vout2 and the power supply voltage V2 by the resistor R34 and the resistor R33 is input to the positive input terminal of the comparator IC31. Further, an output terminal of the comparator IC31 is connected to the gate of the FET11. A voltage of the negative input terminal of the comparator IC31 is determined in accordance with a Duty of the pulse signal output from the Vcont terminal of the main controller 14.

When the voltage of the positive input terminal of the comparator IC31 is higher than that of the negative input terminal, the output terminal of the comparator IC31 is brought into the Hi-Z state. A signal output from the CLK terminal of the main controller 14 directly drives the FET11 to turn on and off. Meanwhile, when the voltage of the positive input terminal of the comparator IC31 is lower than that of the negative input terminal, the output terminal of the comparator IC31 is brought into the Lo state. The current output from the CLK terminal of the main controller 14 is drawn by the output terminal of the comparator IC31, and the gate voltage of the FET11 is forcibly brought into the Lo state. Accordingly, the FET11 cannot be turned on at the timing at which the FET11 is required to be turned on, and hence a rise in (lowering as an absolute value) of the secondary-side power supply voltage Vout2 is accelerated. With this operation, the voltage of the secondary-side power supply voltage Vout2 can be controlled to a predetermined voltage.

As described above, when one power supply voltage is generated by rectifying and smoothing the flyback voltage of the primary coil of the transformer, two power supply voltages having a large difference in voltage and having polarities different from each other can be achieved with a small circuit area and at low cost. Consequently, according to the second embodiment, while suppressing the rise in cost and the increase in area of the board, a plurality of voltages having a large electric potential difference can be generated.

Third Embodiment

Figure 3:
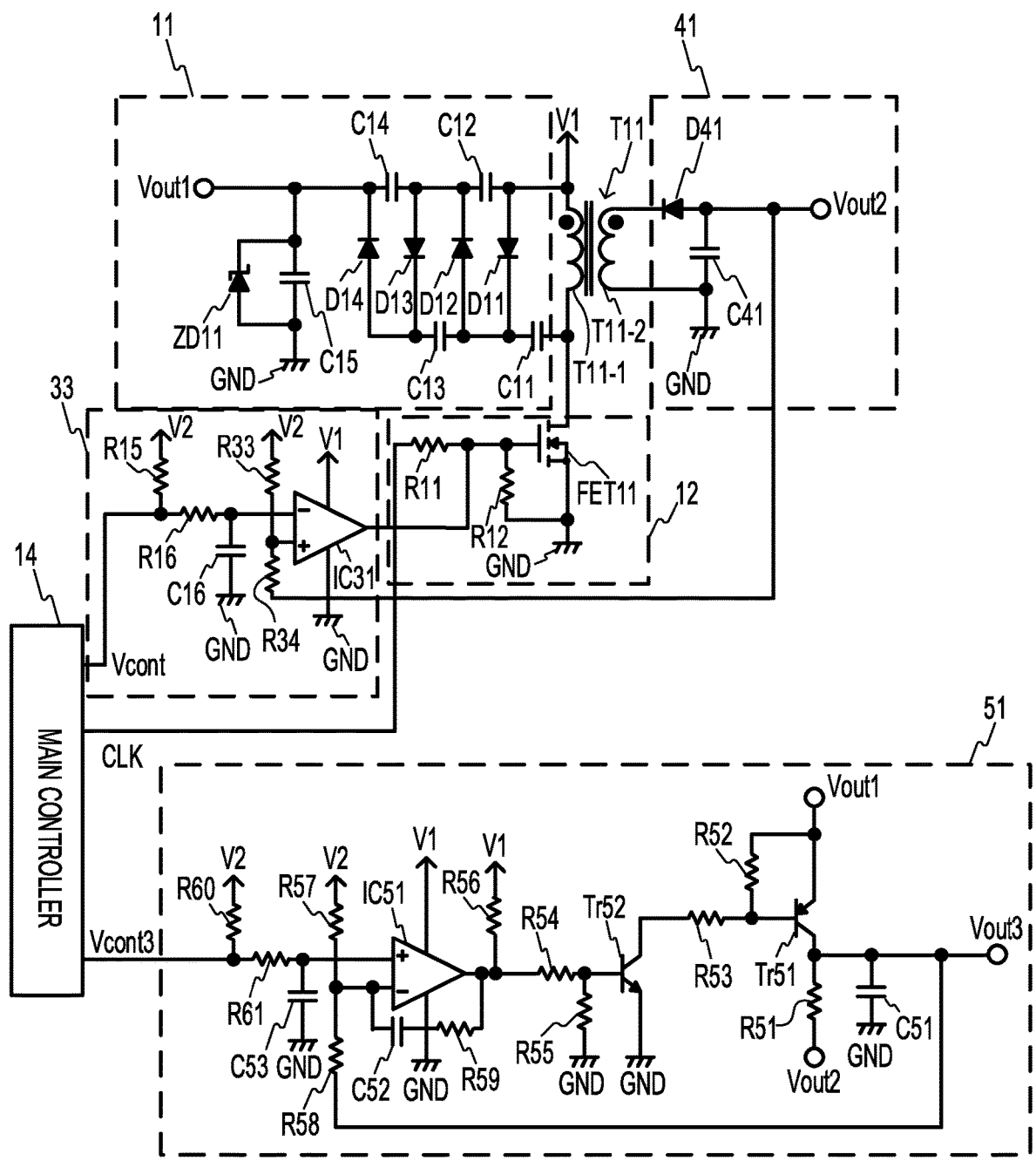
FIG. 3 is a circuit diagram of a power supply apparatus according to a third embodiment.

A third embodiment is described. In the third embodiment, the primary power generator 11 and the drive circuit unit 12 are equivalent to those described in the first embodiment. Further, the secondary power generator 41 and the voltage controller 33 are equivalent to those described in the second embodiment. In the third embodiment, in addition to those components, a third power generator is provided. Thus, in the third embodiment, only the third power generator is described. Configurations which are the same as those of the first embodiment and the second embodiment are denoted by the same reference symbols, and description of remaining parts is omitted. For description, FIG. 3 showing a power circuit is used.

(Third Power Generator 51)

A third power generator 51 being a third generation unit is formed of a PNP transistor (hereinafter referred to as "transistor") Tr51, a bypass resistor R51, and peripheral circuits. In the third embodiment, the bypass resistor R51 being one fixed resistor is connected. However, a plurality of fixed resistors may be connected, and it is only required that one or more fixed resistors be connected. The transistor Tr51 and the bypass resistor R51 are connected in series between the primary-side power supply voltage Vout1 and the secondary-side power supply voltage Vout2. One end of a capacitor C51 is connected to a collector of the transistor Tr51 so that a third power supply voltage Vout3 being a third voltage is output. Another end of the capacitor C51 is connected to the GND.

A resistor R52 is connected between a base and an emitter of the transistor Tr51, and an NPN transistor (hereinafter referred to as "transistor") Tr52 is connected to the base of the transistor Tr51 via a resistor R53. A resistor R55 is connected between a base and an emitter of the transistor Tr52, and an output terminal of an operational amplifier IC51 is connected to the base of the transistor Tr52 via a resistor R54. An output terminal of the operational amplifier IC51 is connected to the power supply voltage V1 via a resistor R56. A negative input terminal of the operational amplifier IC51 is connected to the power supply voltage V2 via a resistor R57, and is connected also to the third power supply voltage Vout3 via a resistor R58. That is, a value obtained by dividing a voltage range between the third power supply voltage Vout3 and the power supply voltage V2 by the resistor R58 and the resistor R57 is input to the negative input terminal of the operational amplifier IC51. A capacitor C52 and a resistor R59 are connected in series between the negative input terminal and the output terminal of the operational amplifier IC51.

A positive input terminal of the operational amplifier IC51 is connected to the power supply voltage V2 via a resistor R61 and a resistor R60, and is connected to the GND via a capacitor C53. A connection point between the resistor R60 and the resistor R61 is connected to a Vcont3 terminal of the main controller 14. The operational amplifier IC51 functions as a feedback unit configured to perform feedback control on the third power supply voltage Vout3 to a predetermined control value in accordance with a signal input from the Vcont3 terminal.

From the Vcont3 terminal of the main controller 14, a pulse signal in which the Hi-Z state and the Lo state are alternately repeated is output. When the Vcont3 terminal is in the Hi-Z state, a current for charging the capacitor C53 flows from the power supply voltage V2 via the resistor R60 and the resistor R61. Meanwhile, when the Vcont3 terminal is in the Lo state, a current for allowing the capacitor C53 to discharge flows to the Vcont3 terminal via the resistor R61. When the pulse signal output from the Vcont3 terminal repeats the Hi-Z state and the Lo state, the balance of charging and discharging of the capacitor C53 is stabilized at a predetermined voltage. Thus, in accordance with a Duty of the pulse signal output from the Vcont3 terminal, a voltage of the positive input terminal of the operational amplifier IC51 is determined. That is, as the Duty of the pulse signal output from the Vcont3 terminal in the Hi-Z state becomes larger, the voltage of the positive input terminal of the operational amplifier IC51 rises. As the Duty becomes smaller, the voltage of the positive input terminal of the operational amplifier IC51 is reduced. The pulse signal output from the Vcont3 terminal is hereinafter referred to as "Vcont3 signal." Further, the Duty given in the Hi-Z state is simply referred to as "Duty."

(Control of Third Power Supply Voltage)

Next, a method of controlling the third power supply voltage Vout3 with the Vcont3 signal is described. The voltage of the output terminal of the operational amplifier IC51 is controlled such that the voltage of the positive input terminal of the operational amplifier IC51 and the voltage of the negative input terminal become equal to each other. When the Duty of the Vcont3 signal is set smaller, the voltage of the positive input terminal of the operational amplifier IC51 is reduced so as to be lower than the voltage of the negative input terminal. As a result, the voltage of the output terminal of the operational amplifier IC51 is lowered. Accordingly, the third power supply voltage Vout3 is lowered. Meanwhile, when the Duty of the Vcont3 signal is set larger, the voltage of the positive input terminal of the operational amplifier IC51 rises so as to be higher than the voltage of the negative input terminal. As a result, the voltage of the output terminal of the operational amplifier IC51 rises. Accordingly, the third power supply voltage Vout3 rises.

(Relationship between Duty of Vcont3 Signal and Third Power Supply Voltage Vout3)

Figure 4:
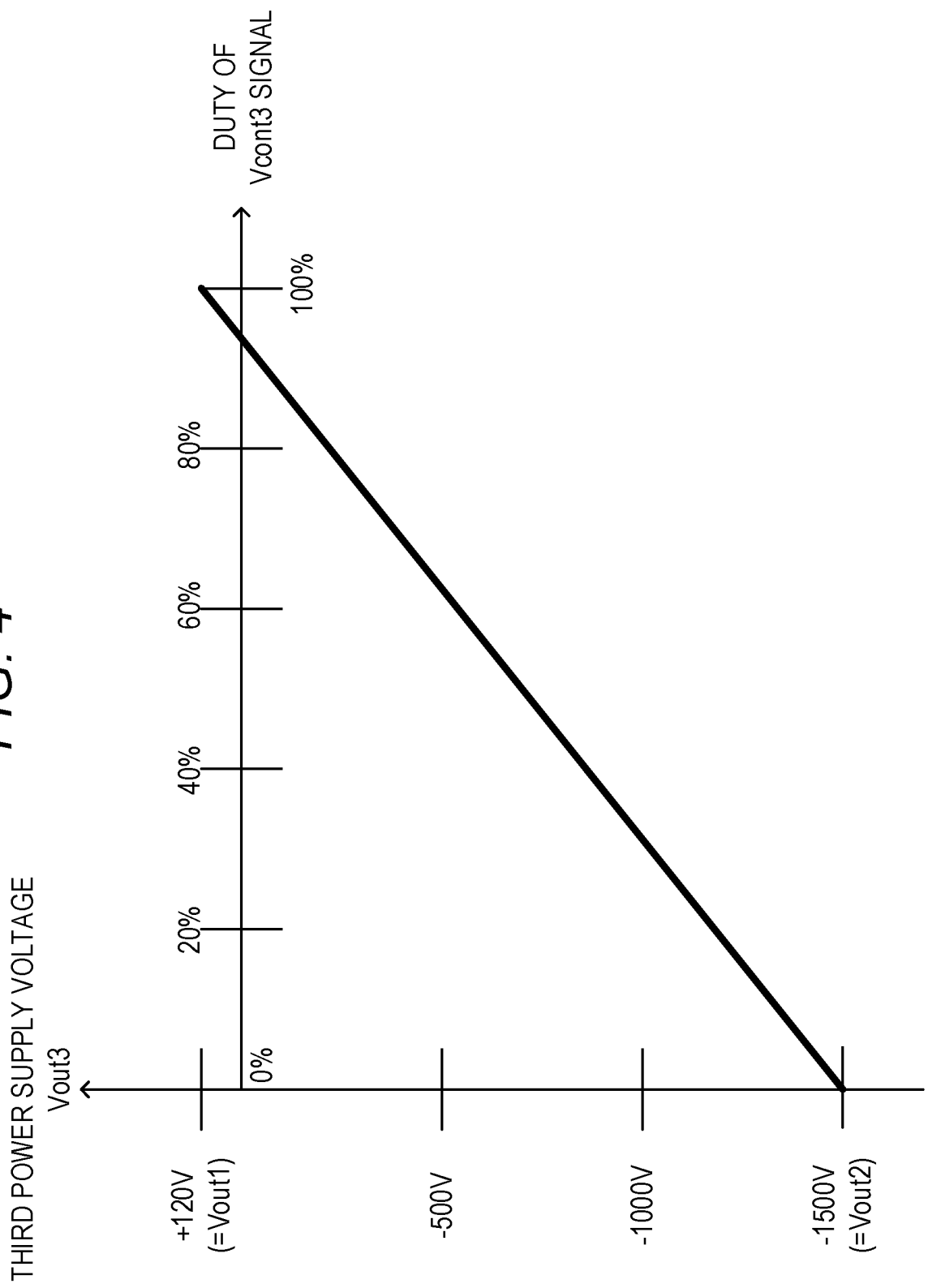
FIG. 4 is a graph for showing a relationship between a duty cycle (Duty) of a Vcont3 signal and a third power supply voltage in the third embodiment.

FIG. 4 is a graph for showing a relationship between the Duty of the Vcont3 signal and the third power supply voltage Vout3. In FIG. 4, the horizontal axis represents the Duty (%) of the Vcont3 signal, and the vertical axis represents the third power supply voltage Vout3 (V). In the third embodiment, the primary-side power supply voltage Vout1 is +120 V, and the secondary-side power supply voltage Vout2 is −1,500 V. When the Duty of the Vcont3 signal is 0%, that is, the voltage of the positive input terminal of the operational amplifier IC51 is 0 V, the third power supply voltage Vout3 is −1,500 V, which is a negative polarity. Further, when the Duty of the Vcont3 signal is 100%, that is, the voltage of the positive input terminal of the operational amplifier IC51 is the power supply voltage V2, the third power supply voltage Vout3 is +120 V, which is a positive polarity. When the Duty of the Vcont3 signal falls between 0% and 100%, the Duty of the Vcont3 signal and the third power supply voltage Vout3 have a relationship of a linear function.

Here, in the third embodiment, the configuration in which the third power supply voltage Vout3 can be changed within a whole range of from the primary-side power supply voltage Vout1 to the secondary-side power supply voltage Vout2 is described. However, the range in which the third power supply voltage Vout3 can be changed may be narrowed. Further, it is not always required that the third power supply voltage Vout3 be variable, and the third power supply voltage Vout3 may be a fixed value. In this case, it is preferred that a second bypass resistor be connected in place of the transistor Tr51, and the primary-side power supply voltage Vout1 and the secondary-side power supply voltage Vout2 be divided together with the bypass resistor R51, thereby outputting the third power supply voltage Vout3. Further, in the third embodiment, the configuration in which the transistor Tr51 being one active element is connected is described. However, a plurality of active elements may be connected, or one or more active elements may be connected. Further, in the third embodiment, the transistor Tr51 and the bypass resistor R51 form a variable resistor. However, a volume resistor may be used. As described above, in the third embodiment, the primary-side power supply voltage Vout1 and the secondary-side power supply voltage Vout2 are connected to each other by any one or both of: one or more fixed resistors; and the variable resistor including one or more active elements. For example, in an image forming apparatus, the third power supply voltage Vout3 is used as the developing voltage in the developing step.

As described above, based on the primary power supply voltage generated with use of the primary coil of the transformer and the secondary power supply voltage generated with use of the secondary coil of the transformer, the third power supply voltage can be achieved with a small circuit area and at low cost. The primary power generator, the secondary power generator, the voltage controller, and the third power generator described in the first to third embodiments may be provided in any combination. Consequently, according to the third embodiment, while suppressing the rise in cost and the increase in area of the board, a plurality of voltages having a large electric potential difference can be generated.

Fourth Embodiment

[Description of Laser Beam Printer]

Figure 5:
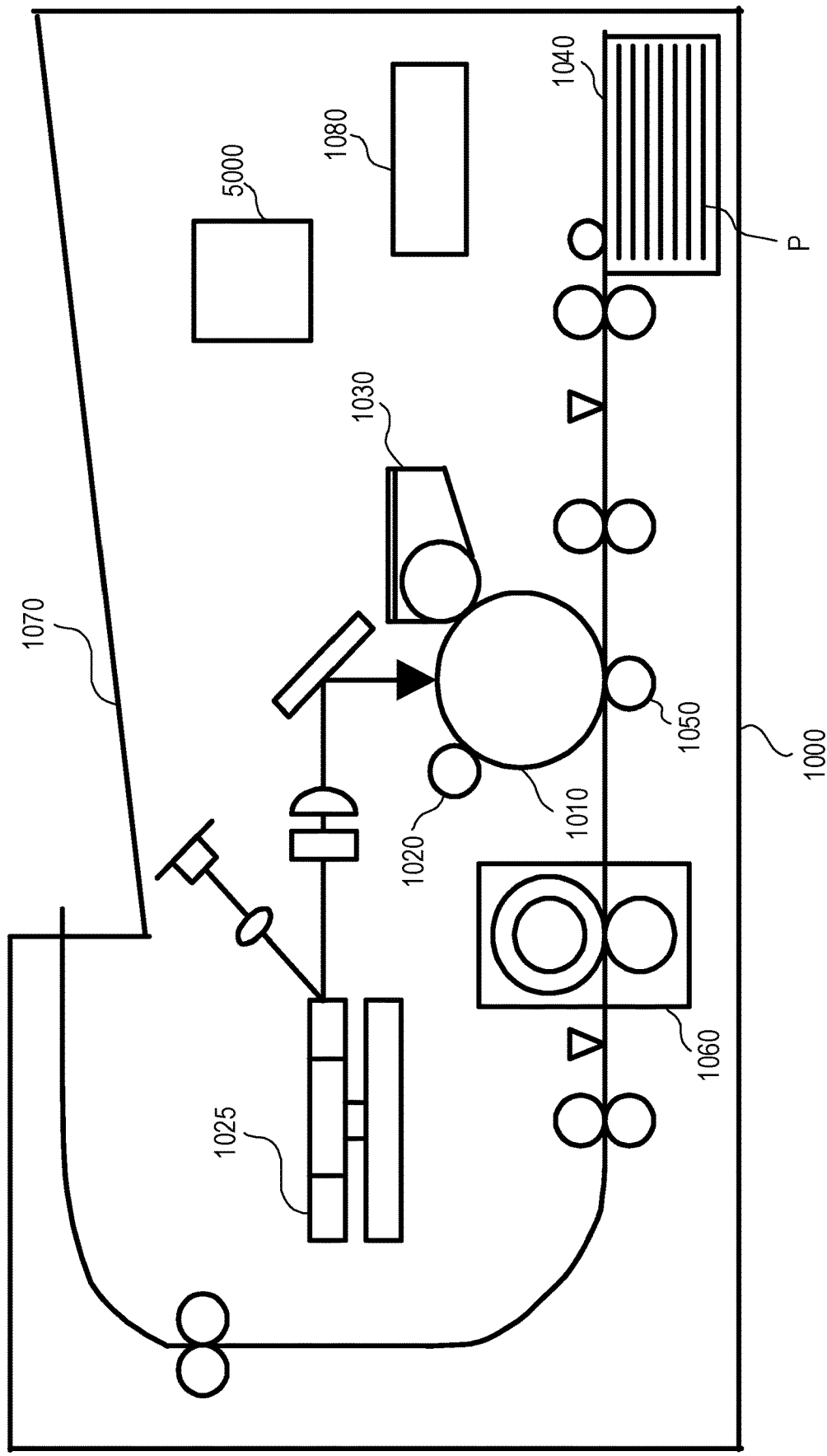
FIG. 5 is a schematic view of a laser beam printer according to a fourth embodiment.

FIG. 5 shows a schematic configuration of a laser printer as an example of an image forming apparatus. A laser beam printer 1000 (hereinafter referred to as "printer 1000") includes a photosensitive drum 1010, a charging unit 1020, and a developing unit 1030. The photosensitive drum 1010 is an image bearing member on which an electrostatic latent image is to be formed. The charging unit 1020 uniformly charges the photosensitive drum 1010. A light scanning device 1025 being an exposure unit forms an electrostatic latent image by scanning the photosensitive drum 1010 with a laser light in accordance with image data. The developing unit 1030 forms a toner image by developing the electrostatic latent image formed on the photosensitive drum 1010 with toner. The toner image formed on the photosensitive drum 1010 (on the image bearing member) is transferred by a transfer unit 1050 onto a sheet P being a recording material supplied from a cassette 1040, and an unfixed toner image having been transferred onto the sheet P is fixed by a fixing device 1060. Then, the sheet P is delivered to a tray 1070. The photosensitive drum 1010, the charging unit 1020, the developing unit 1030, and the transfer unit 1050 form an image forming portion (image forming unit).

Further, the printer 1000 includes a power supply apparatus 1080, and supplies power from the power supply apparatus 1080 to, for example, a drive unit such as a motor, a controller 5000, the charging unit 1020, the developing unit 1030, and the transfer unit 1050. The controller 5000 includes a CPU (not shown), and controls, for example, an image forming operation performed by the image forming portion and a conveyance operation for the sheet P. The power supply apparatus 1080 has any one of the configurations described in the first to third embodiments, and is used for generating a voltage required for the image forming operation. An image forming apparatus to which the power supply apparatus according to this disclosure can be applied is not limited to an image forming apparatus having the configuration illustrated in FIG. 5. Consequently, according to the fourth embodiment, while suppressing the rise in cost and the increase in area of the board, a plurality of voltages having a large electric potential difference can be generated.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-202459, filed Dec. 7, 2020, which is hereby incorporated by reference herein in its entirety.

What is claimed is:

1. A power supply apparatus, comprising:
a transformer including a primary coil and a secondary coil;
a switching element connected in series to the primary coil;
a first generation unit configured to generate a first voltage to be output to a first load from a voltage generated in the primary coil by turning on and off the switching element;
a second generation unit configured to generate a second voltage to be output to a second load from a voltage generated in the secondary coil by turning on and off the switching element;
a third generation unit configured to generate a third voltage by connecting the first voltage and the second voltage to each other by any one or both of: one or more fixed resistors; and a variable resistor including one or more active elements; and
a feedback unit configured to control the third voltage to a predetermined control value,
wherein the first voltage has an absolute value smaller than an absolute value of the second voltage, and the first voltage has a polarity different from a polarity of the second voltage, and
wherein the feedback unit is configured to control the predetermined control value to a positive polarity or a negative polarity.

2. The power supply apparatus according to claim 1, wherein the first voltage has a positive polarity, and the second voltage has a negative polarity.

3. The power supply apparatus according to claim 1, wherein the first generation unit includes a multi-stage rectifying/smoothing circuit in which a plurality of rectifiers each including at least a diode and a capacitor are connected, and
wherein the multi-stage rectifying/smoothing circuit is connected to both ends of the primary coil.

4. The power supply apparatus according to claim 1, wherein the first generation unit includes a diode and a capacitor which are configured to rectify and smooth the voltage generated in the primary coil.

5. The power supply apparatus according to claim 1, wherein the second generation unit includes a rectifying/smoothing circuit including at least a diode and a capacitor, and
wherein the rectifying/smoothing circuit is connected to both ends of the secondary coil.

6. An image forming apparatus, comprising:
an image forming unit configured to form an image on a recording material;
a transformer including a primary coil and a secondary coil;
a switching element connected in series to the primary coil;
a first generation unit configured to generate a first voltage to be output to a first load from a voltage generated in the primary coil by turning on and off the switching element;
a second generation unit configured to generate a second voltage to be output to a second load from a voltage generated in the secondary coil by turning on and off the switching element;
a third generation unit configured to generate a third voltage by connecting the first voltage and the second voltage to each other by any one or both of: one or more fixed resistors; and a variable resistor including one or more active elements; and
a feedback unit configured to control the third voltage to a predetermined control value,
wherein the first voltage has an absolute value smaller than an absolute value of the second voltage, and the first voltage has a polarity different from a polarity of the second voltage, and
wherein the feedback unit is configured to control the predetermined control value to a positive polarity or a negative polarity.

7. The image forming apparatus according to claim 6, wherein the first voltage has a positive polarity, and the second voltage has a negative polarity.

8. The image forming apparatus according to claim 6, wherein the first generation unit includes a multi-stage rectifying/smoothing circuit in which a plurality of rectifiers each including at least a diode and a capacitor are connected, and
wherein the multi-stage rectifying/smoothing circuit is connected to both ends of the primary coil.

9. The image forming apparatus according to claim 6, wherein the first generation unit includes a diode and a capacitor which are configured to rectify and smooth the voltage generated in the primary coil.

10. The image forming apparatus according to claim 6, wherein the second generation unit includes a rectifying/smoothing circuit including at least a diode and a capacitor, and
wherein the rectifying/smoothing circuit is connected to both ends of the secondary coil.

11. The image forming apparatus according to claim 6, wherein the image forming unit includes a developing unit configured to develop an electrostatic latent image formed on a photosensitive drum, and
wherein the first load to which the first generation unit outputs the first voltage is the developing unit.

12. The image forming apparatus according to claim 6, wherein the image forming unit includes a charging unit configured to charge a photosensitive drum, and
wherein the second load to which the second generation unit outputs the second voltage is the charging unit.

* * * * *